(12) United States Patent
Dariush et al.

(10) Patent No.: US 6,633,783 B1
(45) Date of Patent: Oct. 14, 2003

(54) FUZZY LOGIC BASED CONTROL

(75) Inventors: Behzad Dariush, Mountain View, CA (US); Kikuo Fujimura, Palo Alto, CA (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 482 days.

(21) Appl. No.: 09/726,610

(22) Filed: Dec. 1, 2000

Related U.S. Application Data
(60) Provisional application No. 60/209,580, filed on Jun. 6, 2000.

(51) Int. Cl.[7] ............................................. G05B 13/02
(52) U.S. Cl. ....................... 700/50; 700/48; 700/28; 700/51; 700/246; 700/247; 700/250; 706/1; 706/9; 706/52; 706/900; 701/27; 701/40; 701/44; 701/57
(58) Field of Search .............................. 700/50–51, 48, 700/49, 28, 36, 245, 246, 247, 250; 701/27, 40–44, 23, 57, 77, 98, 106, 200; 706/1–9, 52, 900

(56) References Cited

U.S. PATENT DOCUMENTS

| | | |
|---|---|---|
| 4,990,838 A | 2/1991 | Kawato et al. |
| 5,231,335 A | 7/1993 | Mega et al. |
| 5,241,651 A | 8/1993 | Ueda |
| 5,247,432 A | 9/1993 | Ueda |
| 5,432,417 A | 7/1995 | Takenaka et al. |
| 5,459,659 A * | 10/1995 | Takenaka .................... 700/260 |
| 5,701,965 A * | 12/1997 | Kamen et al. ................ 180/7.1 |
| 6,445,983 B1 * | 9/2002 | Dickson et al. ............... 701/23 |

FOREIGN PATENT DOCUMENTS

| | | |
|---|---|---|
| JP | A-4-256130 | 9/1992 |
| JP | A-5-27981 | 2/1993 |
| JP | A-5-150991 | 6/1993 |
| JP | A-5-298422 | 11/1993 |
| JP | A-5-337849 | 12/1993 |
| JP | A-6-44077 | 2/1994 |
| JP | A-6-242956 | 9/1994 |
| JP | A-6-251122 | 9/1994 |

\* cited by examiner

*Primary Examiner*—Ramesh Patel
(74) *Attorney, Agent, or Firm*—Arent Fox Kintner Plotkin & Kahn, PLLC

(57) ABSTRACT

Because of the enormous number of neurons and reflex pathways involved in the control of human motion, a comprehensive identification of the structure of the feedback control circuitry is a formidable experimental task. A theoretical approach based on a carefully developed model could shed light on its likely general structure, thereby providing guidance to experimenters. This paper presents a fuzzy logic based control strategy for modeling the human postural dynamics. In particular, we develop a fuzzy controller to coordinate the movement of a three segment sagittal human model to achieve upright posture. The actuation mechanism of the system consists of six muscle like actuators which are co-activated to modulate the stiffness at the joints. Simulation results are presented to illustrate the underlying principles.

10 Claims, 16 Drawing Sheets

Centroid

FUZZY LOGIC BASED CONTROL

This nonprovisional application claims the benefit of U.S. Provisional Application No. 60/209,580, filed Jun. 6, 2000, the contents of the provisional application hereby incorporated by reference.

BACKGROUND OF THE INVENTION

1. Field of the Invention

The invention relates to a controller for a robot or a human assist device, more specifically, a fuzzy logic controller for controlling the motion of a robot or a human assist device in accordance with human postural dynamics.

2. Description of the Prior Art

The mechanism behind human postural balance is a challenging problem to engineers, biologists, physiologists, medical specialists, and mathematicians, which is discussed in K. Barin, "Evaluation of a generalized model of human postural dynamics and control in the sagittal plane" Biological Cybernetics, 61:37–50, 1989; H. Hemami, F. C. Weimer, C. Robinson, C. Stockwell, and V. S. Cvetkovic, "Biped stability considerations with vestibular models" IEEE Transactions on Automatic Control, 23:1074–1079, 1978; and L. M. Nanshner and G. McCollum "The organization of human postural movements: A formal basis and experimental synthesis" Behav. Brain Sci., 8:135–172, 1985.

An important practical reason for studying postural control is the application of the results in restoring the locomotion function of disabled persons and for developing external assistive devices to enable people to perform tasks with less effort, as discussed by B. Dariush, M. Parnianpour, and H. Hemami "Stability and a control strategy of a multi-link musculoskeletal model with applications in FES" IEEE Transactions on Biomedical Engineering, 45:3–14, 1998.

The most obvious task performed by the human postural control system is the maintenance of the upright bipedal stance. This task is essentially one of generating a series of muscular contractions that produce moments of force about the joints of the musculoskeletal system in order to counteract the effects of gravity. These muscular contractions operate virtually continuously, and it is now well known that in the course of evolution these 'anti-gravity' or 'postural' muscles underwent physiological adaptations to enable them to perform efficiently.

U.S. Pat. No. 5,432,417 entitled "Locomotion Control System for Legged Mobile Robot", assigned to the same assignee of this invention relates to a locomotion control system for a biped walking robot. A walking pattern is pre-established in advance in terms of ZMP (Zero Moment Point) at which point a horizontal moment acting on the robot that is generated by the ground reaction force is zero, a trajectory of the body's attitude. When walking, an actual ground reaction force is detected to determine an actual ZMP position, which is compared with a target ZMP position determined by the ZMP trajectory. The system controls movement of the legs, thighs, and trunk of the robot such that actual ZMP reaches the target ZMP.

Heretofore, human postural dynamics was too complex to be performed by a robot or an artificial device such as human assist systems including artificial legs. There is a need for a system that enables a robot or an artificial human assist device to act in accordance with human postural dynamics.

SUMMARY OF THE INVENTION

In accordance with the present invention, a fuzzy logic controller controls the motion of a robot or a human assist device in accordance with human postural dynamics. The fuzzy logic controller is advantageous when the muscular reactions are required, which are too complex for conventional quantitative techniques. The fuzzy controller parallels the human ability of the use of reason to control processes with imprecise, incomplete, or unreliable information.

In accordance with one aspect of the invention, a fuzzy control system is provided for controlling a posture of an object including a robot and a human assist device that has at least a part that is moved by a pair of actuators provided at one end thereof. The system comprises a system dynamics unit for detecting regulation error of said part, the regulation error being an error of the position of said part relative to a desired position; and a fuzzy controller, responsive to the regulation error and regulation error rate, for performing fuzzy inference process to provide outputs for driving said pair of actuators, whereby the pair of actuators provide antagonist/agonist forces to said part for bringing said object into a regulated posture, In accordance with a specific aspect of the invention, the system dynamics unit includes a controller for controlling the posture of the object, said part being an artificial leg and said pair of actuators acting as muscles for moving the leg. In one embodiment, the object is a biped walking robot.

In accordance with another aspect of the invention, the fuzzy controller comprises fuzzification interface; a knowledge base including a set of control rules on how to control the system; an inference mechanism for evaluating which control rules out of said set of control rules are relevant at the current time and providing outputs; and defuzzification interface for converting the outputs of the inference mechanism into the input to the system dynamics.

In accordance with further aspect of the invention, the fuzzy controller has two inputs corresponding to scaled regulation error and regulation error rate respectively, and has outputs that are to be scaled to produce neural firing rate inputs that generate the muscle forces for said pair of actuators. The knowledge base includes a rule table of conditional statements, the scaled regulation error and the regulation error rate being if-parts of the conditional statements and the outputs being then-parts of the conditional statements. The defuzzification interface, responsive to the outputs from the inference mechanism, produces a single crisp number using centroid defuzzification method.

In accordance with another aspect of the invention, a fuzzy control system for controlling a posture of a biped walking robot having a leg, a thigh and a trunk is provided. The leg, thigh and trunk respectively is moved by at least a pair of actuators provided at one end. The system comprises a musculoskeletal system unit for detecting regulation error of the leg, the regulation error being an error of the position of the leg relative to a desired position; and a leg segment fuzzy controller, responsive to the regulation error and regulation error rate, for performing fuzzy inference process to provide outputs for driving said pair of actuators, whereby the pair of actuators provide antagonist/agonist forces to the leg for bringing the robot into a regulated posture.

In one embodiment, the musculeskeletal system unit detects regulation error of the thigh, the regulation error being an error of the position of the thigh relative to a desired position, the system further comprising a thigh segment fuzzy controller, responsive to the regulation error and the regulation error rate of the thigh, for performing fuzzy inference process to provide outputs for driving the thigh.

In another embodiment, the musculeskeletal system unit detects regulation error of the trunk, the regulation error being an error of the position of the trunk relative to a desired position, the system further comprising a trunk segment fuzzy controller, responsive to the regulation error and the regulation error rate of the thigh, for performing fuzzy inference process to provide outputs for driving the trunk.

DETAILED DESCRIPTION OF THE PREFERRED EMBODIMENTS

Figure 1:
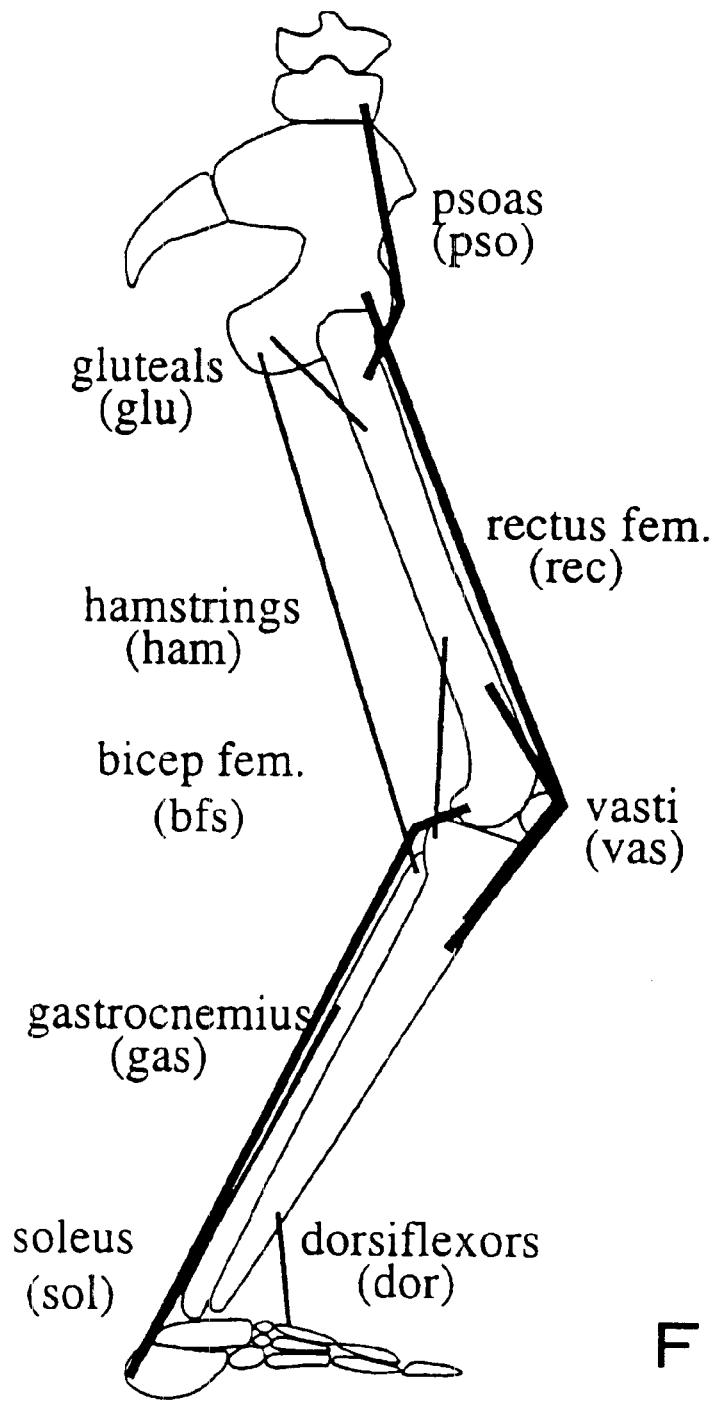
FIG. 1 shows a lower extremity musculature modeling the leg, thigh, and trunk in the sagittal plane.

Referring to FIG. 1, a planar three segment sagittal system modeling the leg, thigh, and trunk is considered for the example simulations. The lower extremity musculature with nine major muscle groups are shown. In order to keep the formulations simple, only mono-articular muscles (muscles spanning a single joint) are used. These muscles include dorsiflexors, soleus, vasti, bicep femoris, psoas, and gluteals. Biarticular muscles influence multiple joints and their characterization is more challenging and will be considered in future studies.

In one embodiment, the present invention is used with the biped walking robot as described in the aforementioned U.S. Pat. No. 5,432,417, which is incorporated herein by reference.

The equation governing the dynamics of the musculoskeletal system is described by, $$J(\Theta)\ddot{\Theta} + H(\Theta, \dot{\Theta})\dot{\Theta} + G(\Theta) = -\frac{\partial L^T}{\partial \Theta}F \quad (1)$$

The quantities J and G are the positive definite inertia matrix, and the gravity vector, respectively. The term $H(\Theta, \dot{\Theta})\dot{\Theta}$ describes the effects of the coriolis and centripetal torques. The right hand side of equation (1) describes the input torque generated by the muscle actuators, where F is the vector of muscle forces and $$-\frac{\partial L^T}{\partial \Theta}$$

is the moment arm matrix. The negative sign is needed because positive work is done by the muscles when they contract concentrically. The vector $\Theta=[\theta_1, \theta_2, \theta_3]^T$ corresponds to the joint angles at the ankle, knee, and hip joint, respectively. These angles are measured from the vertical with a positive sign corresponding to clockwise direction.

The following is the structure of the moment arm matrix for the selected muscles, $$\frac{\partial L^T}{\partial \Theta} = \begin{bmatrix} dor & sol & vas & bfs & pso & glu \\ -1 & 1 & 1 & -1 & 0 & 0 \\ 0 & 0 & -1 & 1 & 1 & -1 \\ 0 & 0 & 0 & 0 & -1 & 1 \end{bmatrix} \quad (2)$$

Without loss of generality, the elements of the above matrix are assumed to be unity for convenience. The exact values of the moment arms will greatly affect the generated muscle forces, however, here we focus on the methodology of the fuzzy control system. Refer to the aforementioned Dariush et al reference for more precise values for the moment arm matrices.

Fuzzy Postural Control

Fuzzy control provides a convenient method for constructing nonlinear controllers via the use of heuristic information. Such heuristic information may come from an operator who has acted as a "human-in-the-loop" controller for a process. Fuzzy control parallels the human reasoning ability to control processes with imprecise, incomplete, or unreliable information. In addition, fuzzy logic control can cope with transmission delays, nonlinear muscle dynamics, redundancy in actuation, and nonlinearities due to physical and physiological constraints. The relative efficacy of the fuzzy controller can thus be tested in relation to its ability to satisfy various objectives. These objectives include stabilization and upright regulation of the center of mass, satisfaction of physiological limits of muscle actuators, and tolerance to transmission delays.

Inverted Pendulum Model

Multi-linkage systems can be viewed as a series of coupled inverted pendulums stacked on top of each other. The mechanism of fuzzy control of such systems can be more intuitively understood by considering the control of an inverted pendulum and extending the results to the three link system consisting of the leg, thigh, and trunk. For simplicity, the coupling effects between segments are not considered in this paper.

Figure 2:
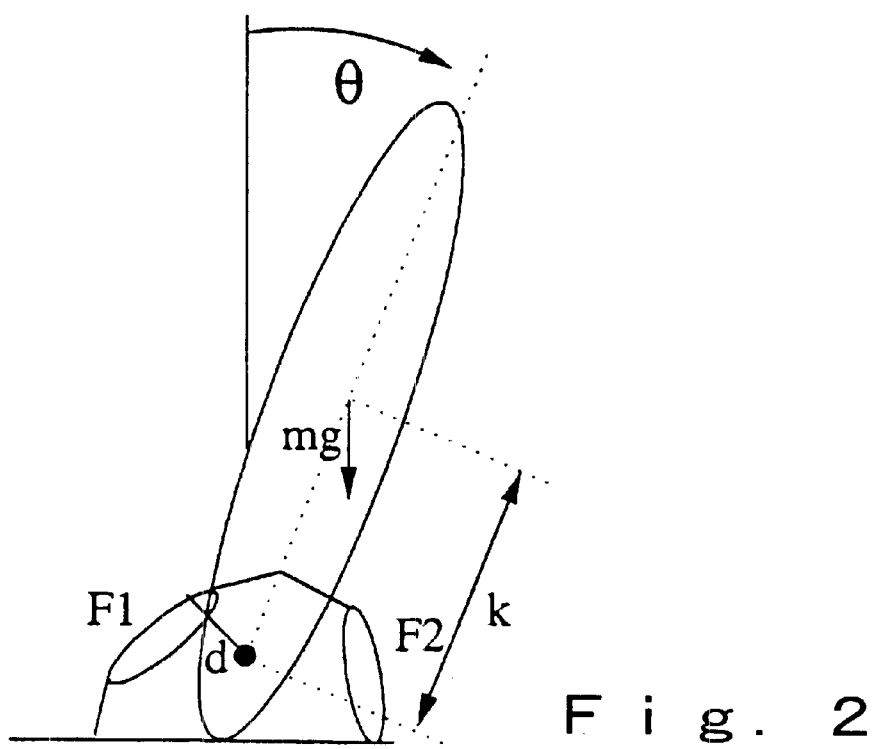
FIG. 2 shows a planar inverted pendulum controlled by a pair of actuators F1 and F2.

Referring now to FIG. 2, the depicted system represents an inverted pendulum actuated by a pair of forces. In humans, the analogy can be made to the control of a sagittal arm by a flexor/extensor muscle pair. The system is constrained at the base and controlled by the two forces F1 and F2 which rotate the pendulum (arm) clockwise or counterclockwise, respectively. The angle θ is measured from the vertical. The physical parameters of the system are its mass m, the distance from the pivot to the location of the applied force (moment arm) d, and the distance from the pivot to the center of mass of the pendulum k.

Fuzzy Control System

Figure 3:
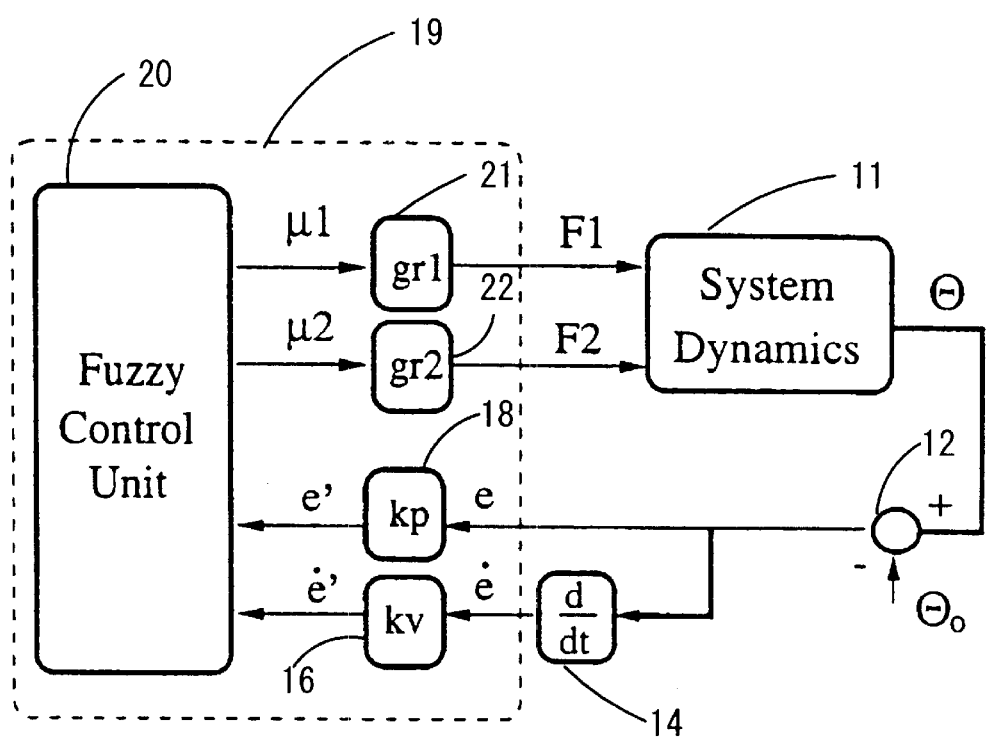
FIG. 3 is a block diagram of fuzzy control of inverted pendulum.

The block diagram of the fuzzy controller for the inverted pendulum is illustrated in FIG. 3. The fuzzy controller 19 includes a fuzzy control unit 20, gain controllers 16 and 18, and gain controllers 21 and 22. In the simulations, this subsystem will be extended to the three link system as shown in the block diagram of FIG. 4. The fuzzy controller in FIG. 4 includes a fuzzy controller for leg segment 31 which corresponds to fuzzy controller 19 in FIG. 3, a fuzzy controller for thigh segment 32, and a fuzzy controller for trunk segment 33.

For simplicity, in the system of FIG. 3, assume that the control system receives a desired state vector, Θo=0 from a higher level of the CNS (Central Nervous System). That is, it is assumed that the desired position of the leg or the inverted pendulum is exactly vertical. The system compares it with the estimated state Θ, and generate simultaneously activated (co-activated) sensorimotor commands to the muscles from the CNS, which then produce the muscular forces F1 and F2.

Specifically, the regulation error e as determined by a comparator 12 and error rate de/dt as determined by differentiation of the regulation error at an diffentiator 14 are input to the fuzzy control unit, which then produces outputs $\mu 1$ and $\mu 2$, which in turn are multiplied by gain factor gr1 and gr2 respectively at gain controllers 21 and 22 to generate the muscular forces F1 and F2.

Through co-activation of the muscle pairs, it is possible to modulate the stiffness at the joint. The transition from one posture to another is achieved by adjusting the relative intensity of neural signals to each of the opposing muscles so that the equilibrium point defined by their interaction moves toward either flexion or extension of the limb.

Figure 8:
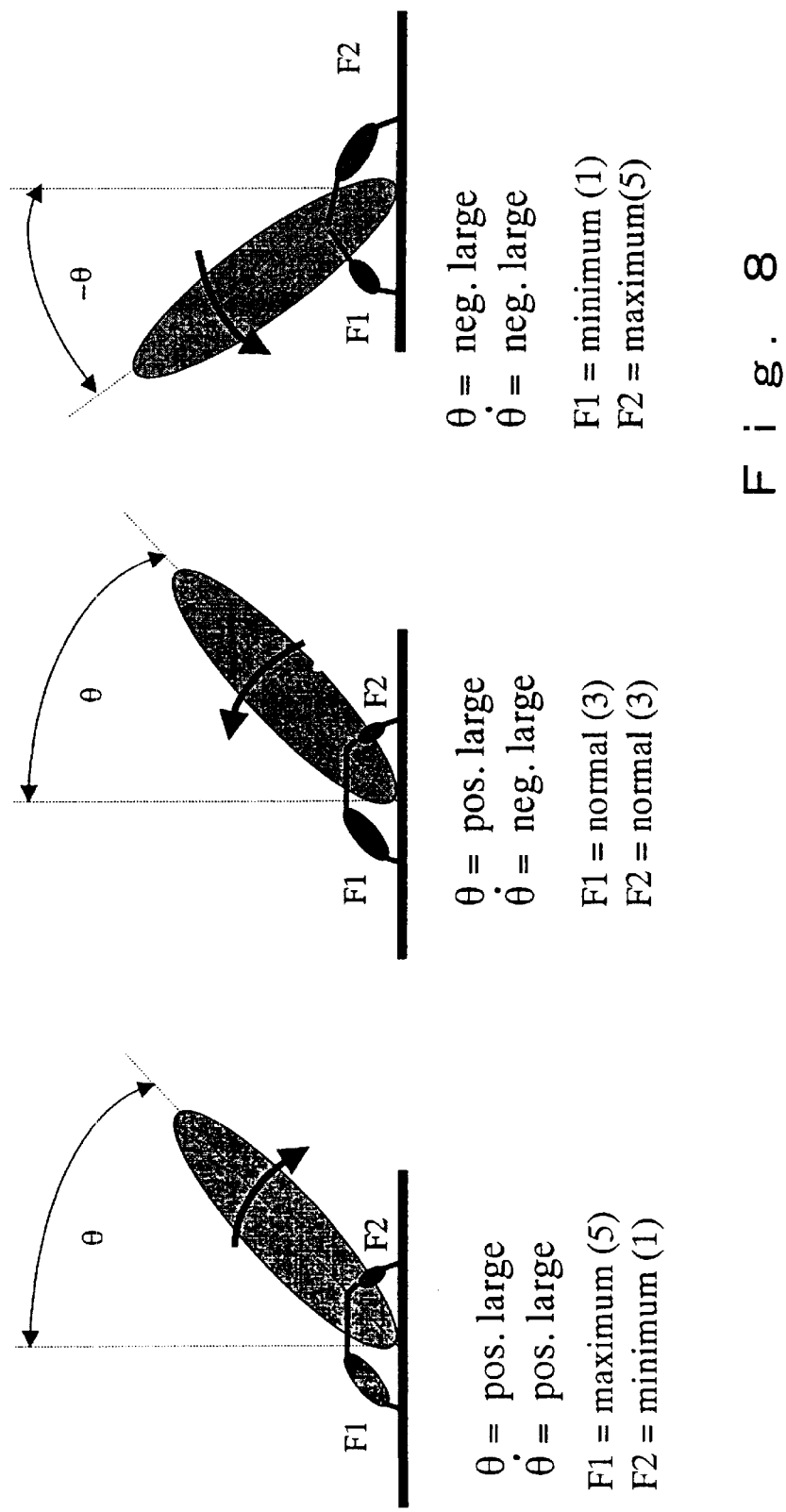
FIG. 8 shows a pair of forces F1 and F2 applied to the inverted pendulum in accordance with the rule table with its target position assumed to be vertical.

FIG. 8 shows the muscular forces F1 and F2 applied to the inverted pendulum under the above mentioned assumptions. The forces F1 and F2 are produced in accordance with the rule table 1 to be described hereafter.

Figure 5:
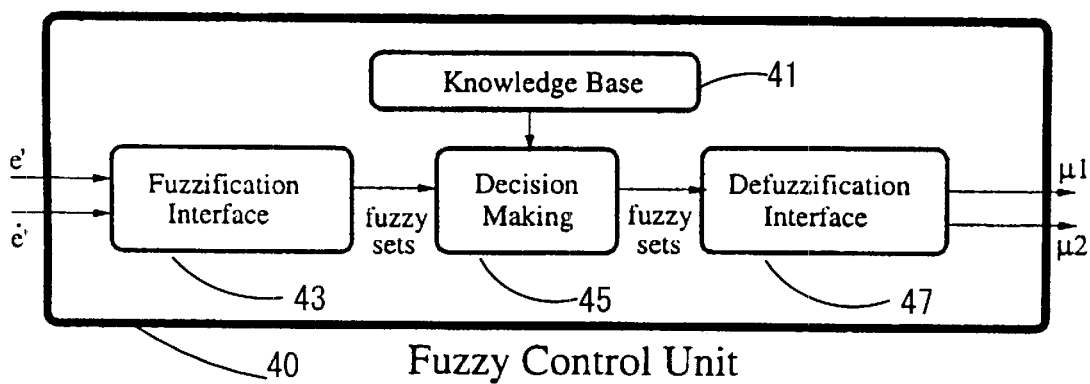
FIG. 5 is a block diagram showing components of the fuzzy control unit.

The different modules in the fuzzy control unit are shown in FIG. 5. The "knowledge base" 41 consists of a set of rules on how best to control the system. The inference mechanism (or decision making block 45) evaluates which control rules are relevant at the current time and then decides what the input to the system should be. The fuzzification interface 43 simply modifies the inputs so that they can be interpreted and compared to the rules in the rule base. Finally, the defuzzification interface 47 converts the conclusions reached by the inference mechanism into the inputs to the system.

The fuzzy control unit 40 has two inputs e' and de/dt', corresponding to the scaled regulation error and the regulation error rate, respectively. The output of the controller are the signals $\mu 1$ and $\mu 2$, which are scaled by the gains gr1 and gr2 to produce the neural firing rate inputs that generate the muscle forces F1 and F2. The control gains kp, kv, gr1, and gr2 are design parameters which may be tuned to meet the desired performance specifications.

In developing the fuzzy controller, the first step is to take the inputs and determine the degree to which they belong to each of the appropriate fuzzy sets via membership functions. The inputs are crisp numerical values grouped into the regulation error and error rate and are assigned to fuzzy sets having the following linguistic values:

Inputs
  regulation error, e
    $x_1^1$:Negative Large (NL)
    $x_1^2$:Negative Small (NS)
    $x_1^3$:Nearly Zero (NZ)
    $x_1^4$:Positive Small (PS)
    $x_1^5$:Positive Large (PL)
  regulation error rate, de/dt
    $x_2^1$:Negative Large (NL)
    $x_2^2$:Negative Small (NS)
    $x_2^3$:Nearly Zero (NZ)
    $x_2^4$:Positive Small (PS)
    $x_2^5$:Positive Large (PL)

Figure 6:
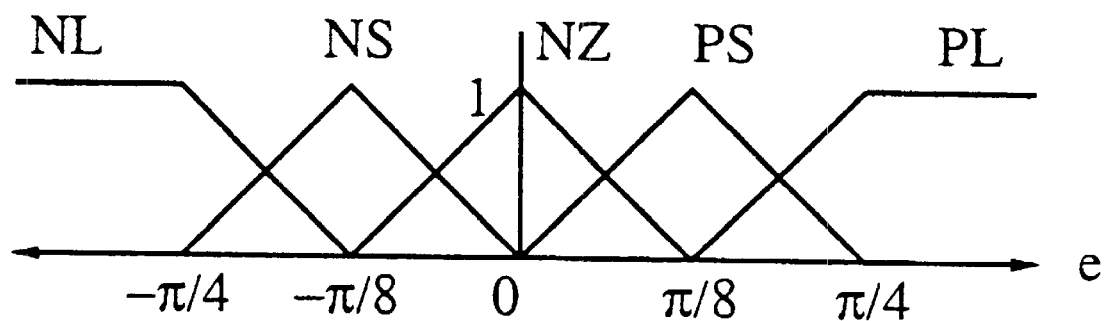
FIG. 6 depicts membership functions for the input universe of discourse corresponding to the error e and the error rate de/dt.
Figure 6:
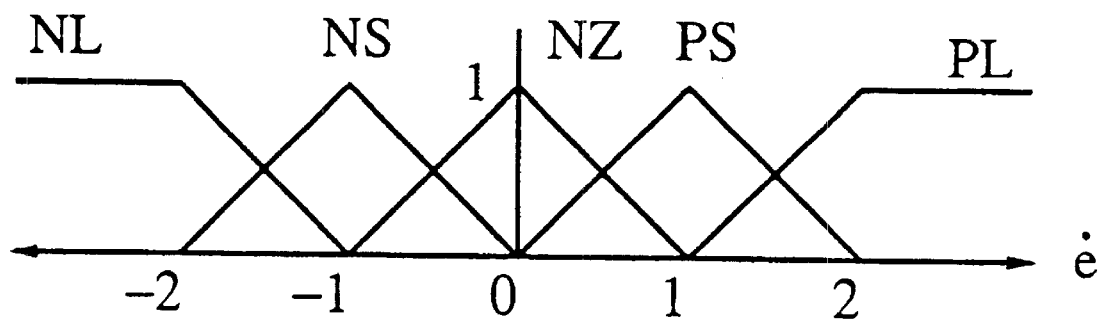

The membership functions used for each input variable is shown in FIG. 6. The reason for choosing the functions in this specific format are multiple, foremost to limit the number of fuzzy sets, but still obtain a linear mapping in the normal operating region of the system. The saturation point (scaling) of each input variable was set using physical knowledge of the system, and optimized using simulation trials. The implication method used is a conventional AND= minimum method which truncates the output fuzzy set. The AND=minimum method is described in G. Klir and B. Yuan, "Fuzzy Sets and Fuzzy Logic: Theory and Applications" Prentice Hall, Englewood Cliffs, N.J. 1995.

Figure 7:
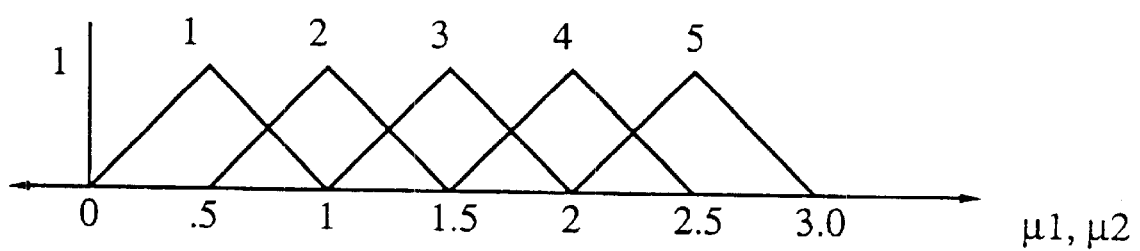
FIG. 7 depicts membership functions for the muscle forces in the antagonist and agonist muscle pairs.

The membership function for the outputs, corresponding to forces generated by antagonist/agonist muscle pairs, are shown in FIG. 7. The outputs are assigned the following linguistic values.

Outputs
  Muscle force flexor/extensor actuator pairs
    $y_1^1 = y_2^1$:Minimum (1)
    $y_1^2 = y_2^2$:Small (2)
    $y_1^3 = y_2^3$:Normal (3)
    $y_1^4 = y_2^4$:Large (4)
    $y_1^5 = y_2^5$:Maximum (5)

The Knowledge Base

The rule base is constructed based on knowledge and intuition from the physics of the problem and experimental observations on activation mechanisms of physiological systems. Let A and B be linguistic values defined by fuzzy sets on the ranges x and y, respectively. The rule table consists of conditional statements, if-then rules, which assume the form: If x1 is A1 and x2 is A2 then y1 is B1 and y2 is B2.

Table 1 contains a set of twenty-five rules containing the premise/consequence information. Table 1 is a rule table for a single inverted pendulum actuated by a pair of muscle like actuators. The numerical entries represent the linguistic-numeric consequents of the rules. For example, the entry in the last row and last column of the rule table can be interpreted as follows:

If the error (angle from vertical) is positive large and the rate of error is positive large, then the force F1 is maximum and the force F2 is minimum.

TABLE 1

| de/dt\e | NL   | NS   | NZ   | PS   | PL   |
|---------|------|------|------|------|------|
| NL      | 1, 5 | 1, 5 | 1, 5 | 2, 4 | 3, 3 |
| NS      | 1, 5 | 1, 5 | 2, 4 | 3, 3 | 4, 2 |
| NZ      | 1, 5 | 2, 4 | 3, 3 | 4, 2 | 5, 1 |
| PS      | 2, 4 | 3, 3 | 4, 2 | 5, 1 | 5, 1 |
| PL      | 3, 3 | 4, 2 | 5, 1 | 5, 1 | 5, 1 |

The large muscular tension F1 is required to return the system back to upright posture. The muscle force F2 is activated in order to achieve a minimum degree of co-activation as is observed in humans.

The inferencing methodology used here was developed by Mamdani as described in E. H. Mamdani and S. Assilian "An experiment in linguistic synthesis with a fuzzy logic controller", International Journal of Man Machine Studies, 7(1):1–13, 1975. Mamdani-style inference expects the output membership functions to be fuzzy sets. After the aggregation process, there is a fuzzy set for each output variable that needs defuzzification. The input for the defuzzification process is a fuzzy set and the output is a single crisp number, obtained using the centroid defuzzification method.

Figure 9:
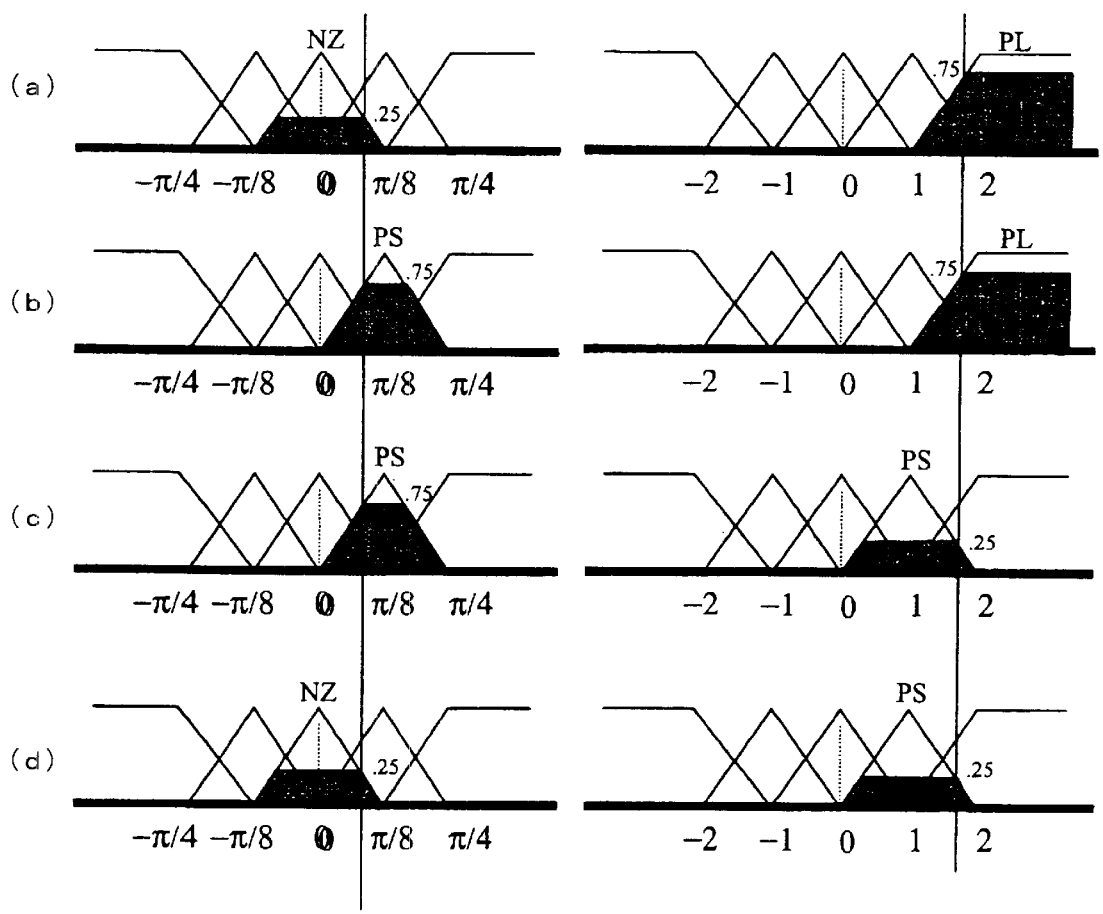
FIGS. 9(a) to 9(d) are a chart showing an example of a fuzzy operation "And=minimum" method.
Figure 10:
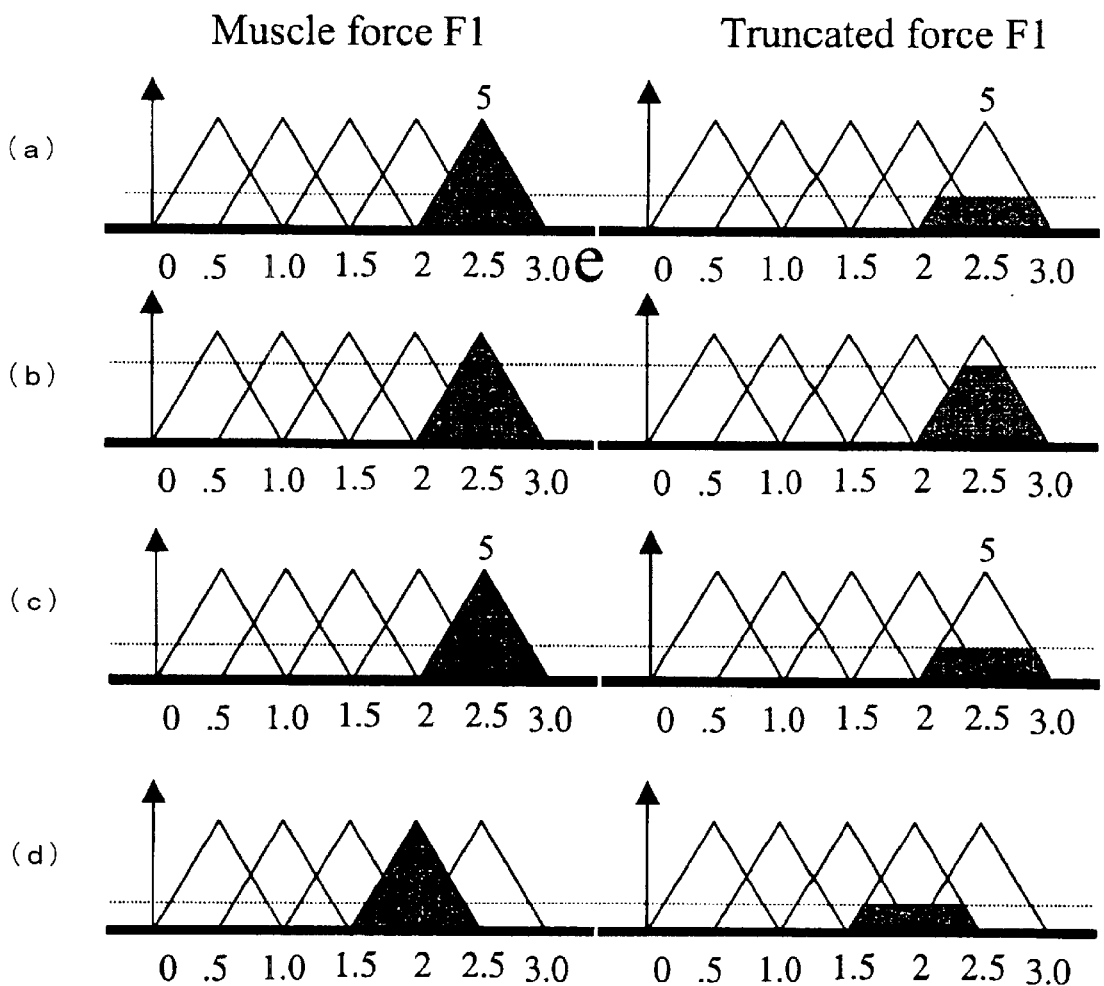
FIGS. 10(a) to 10(d) are a chart showing an example of an implication truncation method.
Figure 11:
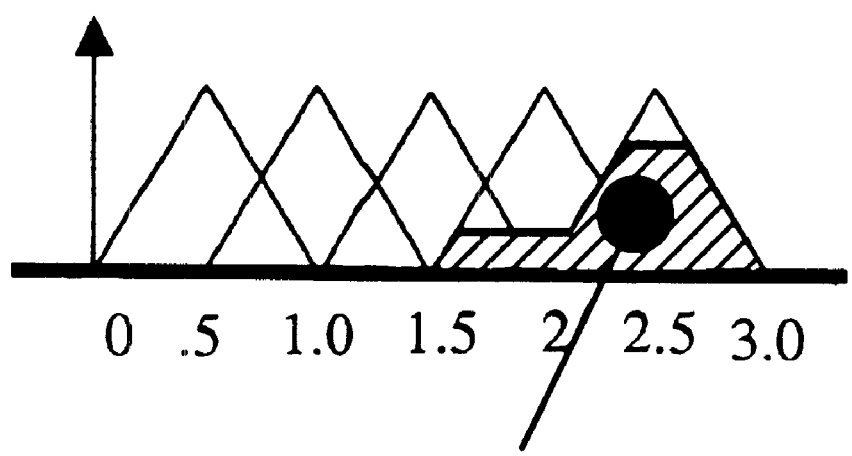
FIG. 11 is a chart showing an example of an aggregation method.

FIGS. 9, 10 and 11 show an example of the fuzzy operation "And=minimum" method, implication truncation method, and aggregation method wherein muscle force F1 is generated responsive to an error input of $\pi/16$ and an error rate input of 1.5. Referring to FIG. 9, the error input of $\pi/16$ crosses membership functions NZ and PS at 0.25 and 0.75 respectively, and the error rate input of 1.5 crosses membership functions PL and PS at 0.75 and 0.25 respectively. FIGS. 9(a) and 10(a) correspond to the rule "If error is NZ and error rate is PL, then F1 output is 5" in accordance with the Table 1. Minimum of crossing point values of NZ and PL, that is 0.25 in this example, is used to truncate the membership function 5 for the muscle force F1. The same operation is carried out relative to the other rule as shown in (b), (c) and (d) of FIGS. 9 and 10.

A plurality of truncated implication outputs as shown in the right-hand side of FIG. 10 are aggregated (ORed) to produce a shape as shown in FIG. 11. The centroid of the aggregated output is calculated to produce a single number output. This single number is used to generate muscle force output F1. The same procedure is applied to generate muscle force output F2.

Simulations

Figure 4:
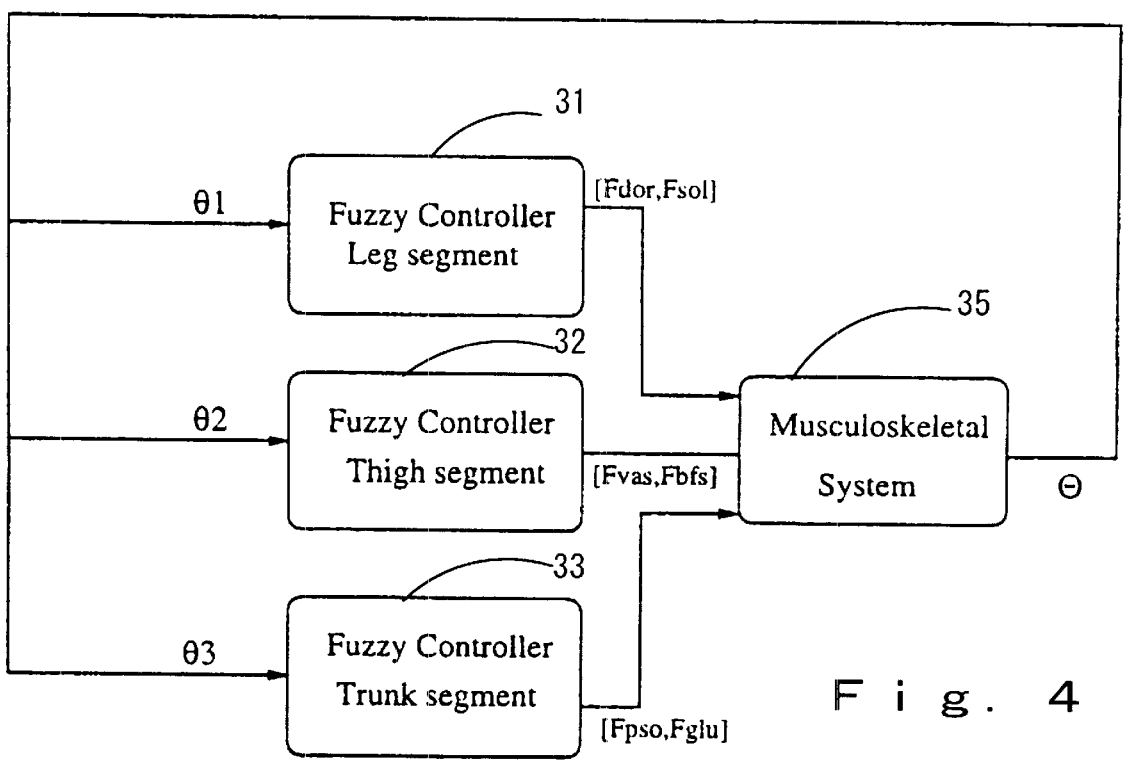
FIG. 4 is a block diagram of the fuzzy logic based control of the three segment sagittal system.

We now consider extending the results of the inverted pendulum controller to the three segment system. The block-diagram of the controller is shown in FIG. 4. The three joint angles (measured from the vertical) are $\theta_1$, $\theta_2$, and $\theta_3$.

Figure 12:
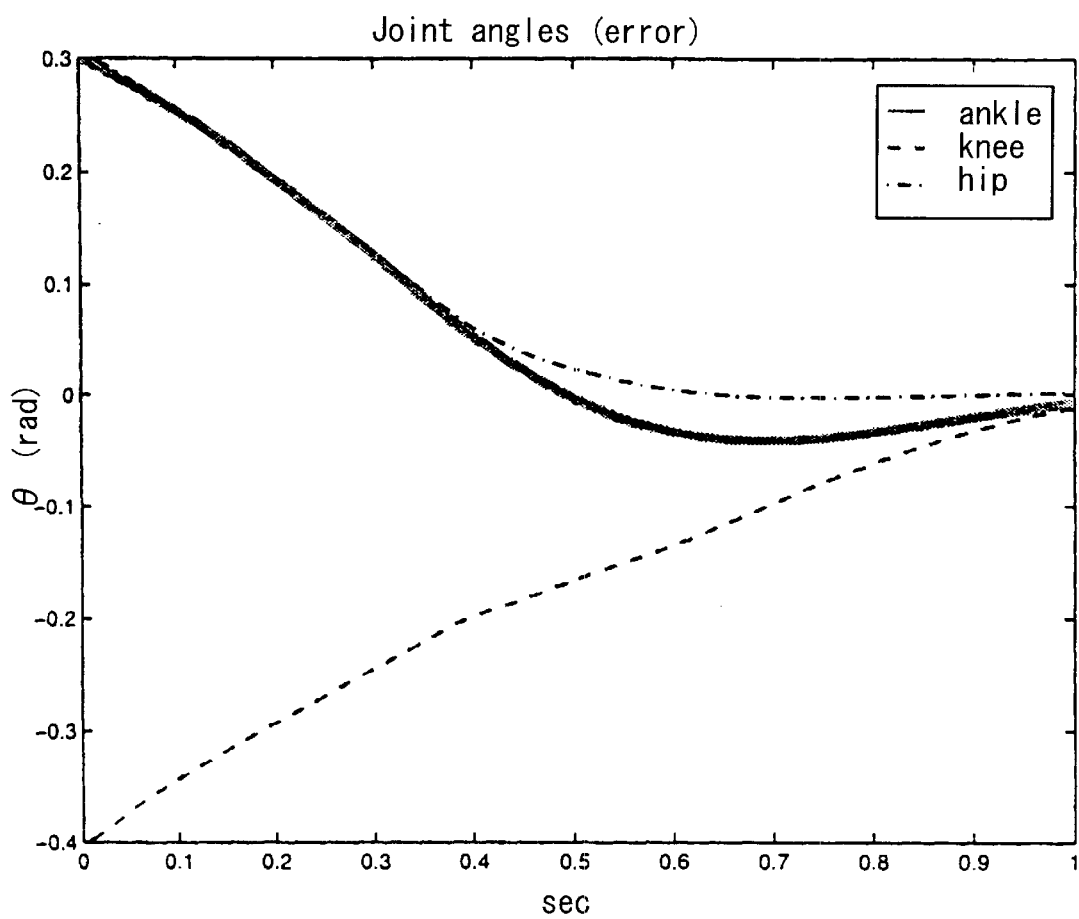
FIG. 12 shows the transition of the joint angles (error) after the robot is released from its initial position at time zero.
Figure 13:
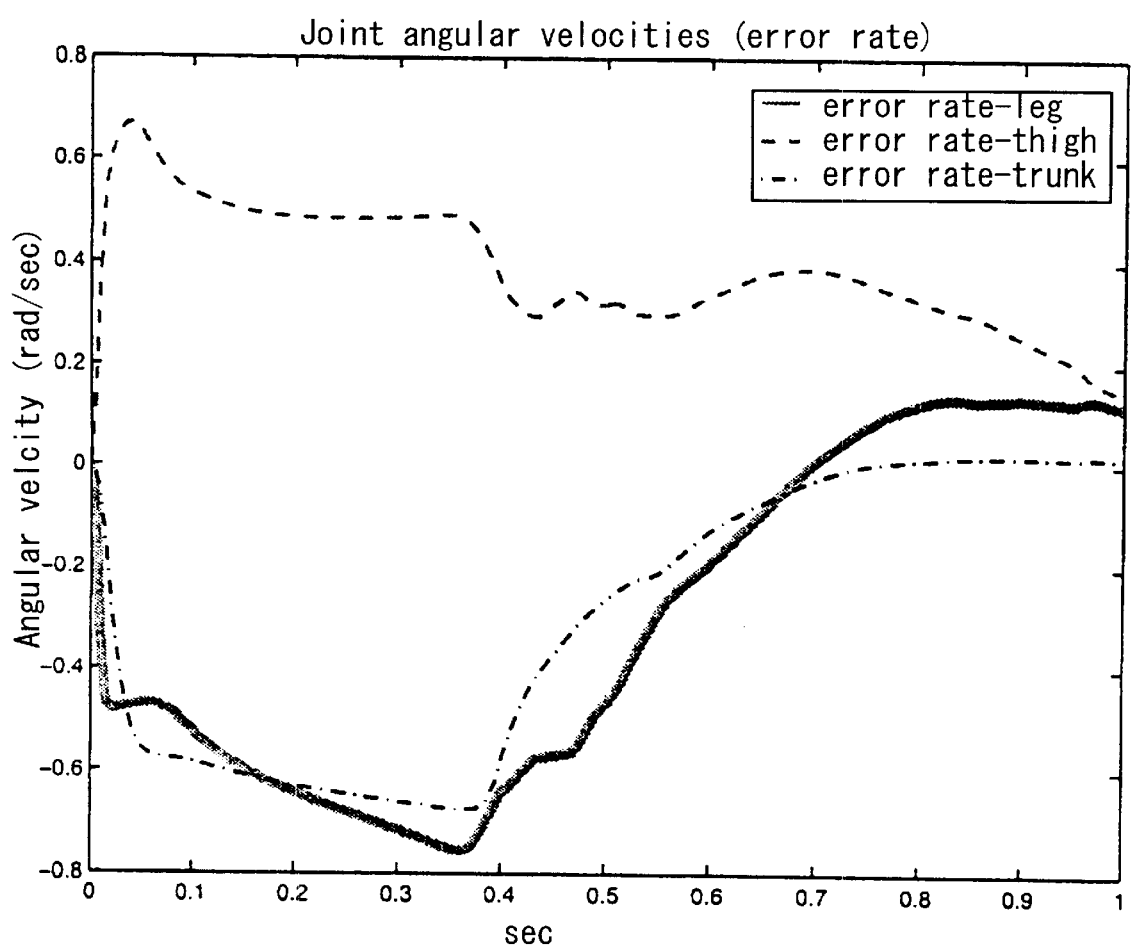
FIG. 13 shows the transition of the joint angular velocities (error rate) after the robot is released from its initial position at time zero.

The system is released from an initial position $\Theta=[0.3-0.4\ 0.3]^T$ radians and allowed to return to the upright stance. The error (joint angles) and error rate of the three segment system using the fuzzy logic controller are shown in FIG. 12 and FIG. 13, respectively. The response behavior and response time for postural recovery can be controlled by adjusting the scaling gains gr1, gr2, kp, and kv, which in effect result in scaling the horizontal axis of the membership functions.

Considering the input membership function for the error, the scaling gain has the following effect:

If kp=1, there is no effect on the membership functions

If kp<1, the membership functions are uniformly "spread out". This changes the meaning of the linguistic so that, for example, "Positive Large" is now characterized by membership functions that represent larger numbers.

If kp>1, the membership functions are uniformly "contracted". This changes the meaning of the linguistics so that, for example, "Positive Large" is now characterized by a membership function that represents smaller numbers.

Figure 14:
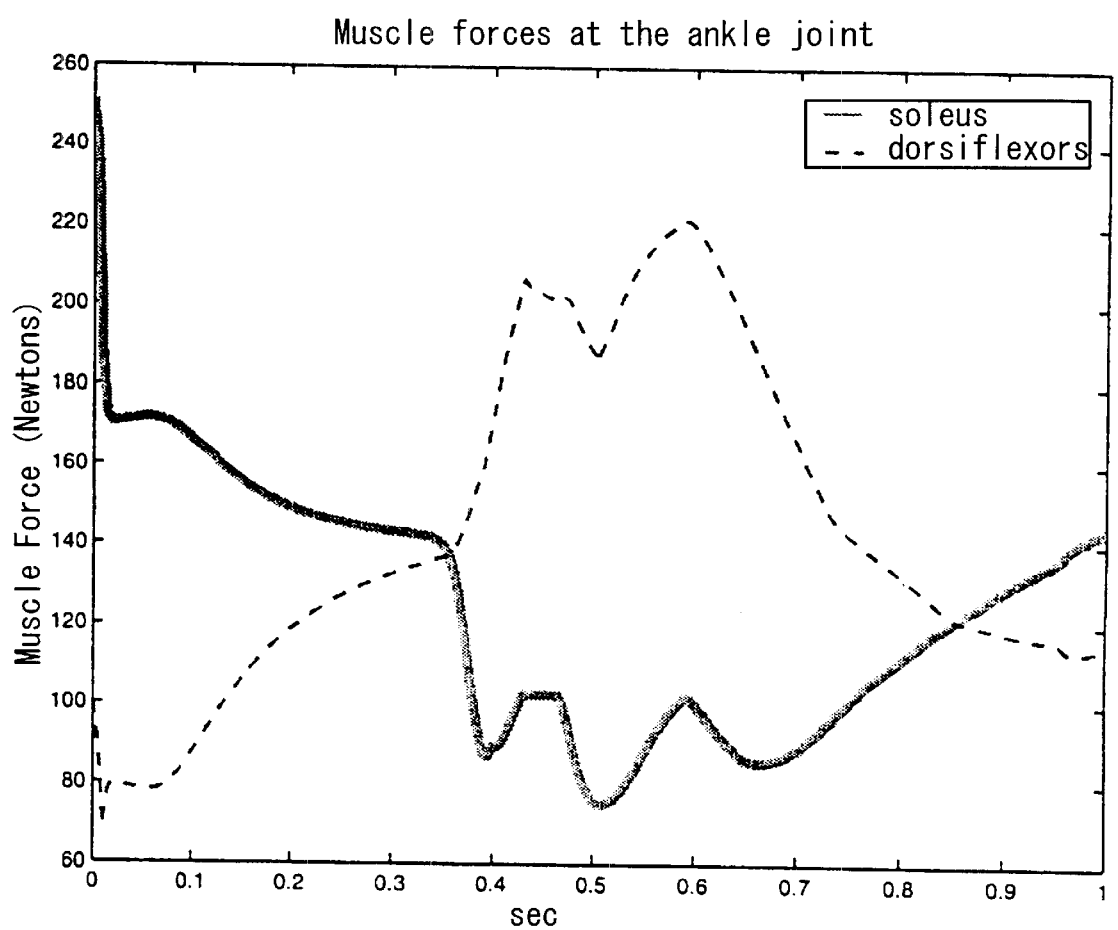
FIG. 14 shows transition of muscle forces at the ankle joint after the robot is released from its initial position at time zero.
Figure 15:
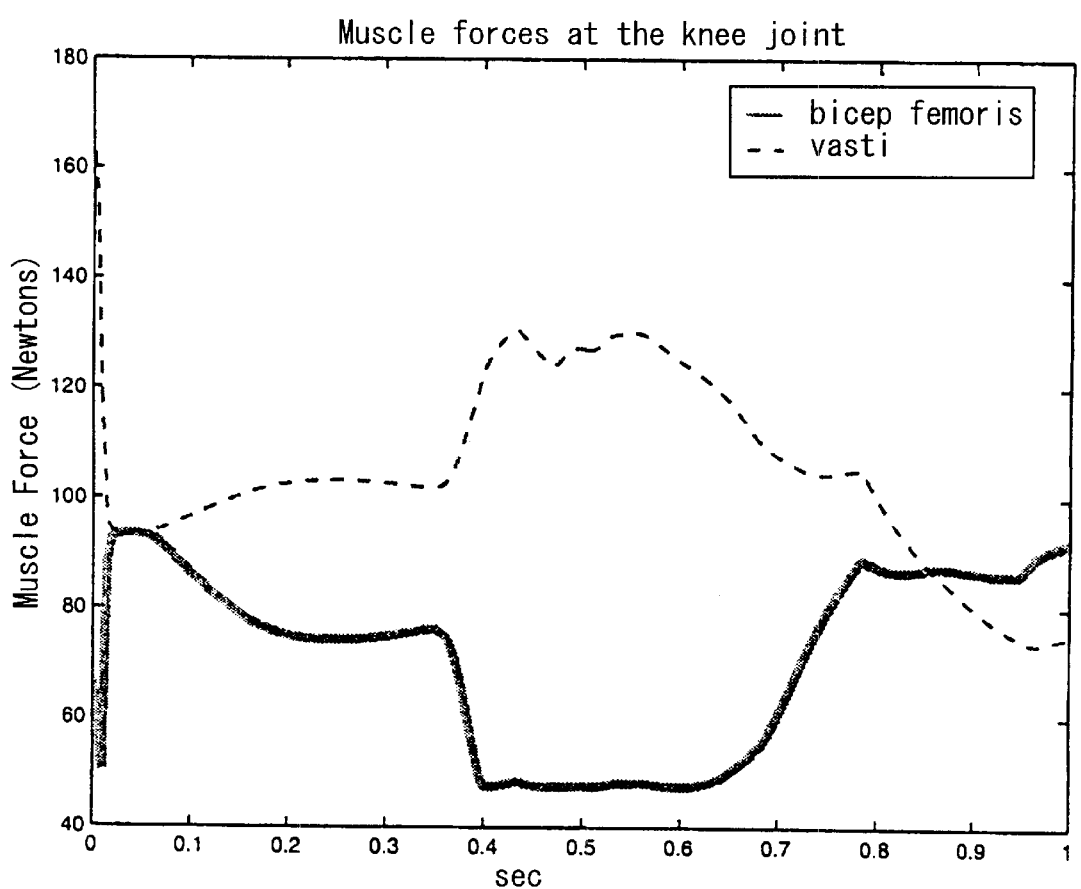
FIG. 15 shows transition of muscle forces at the knee joint after the robot is released from its initial position at time zero.
Figure 16:
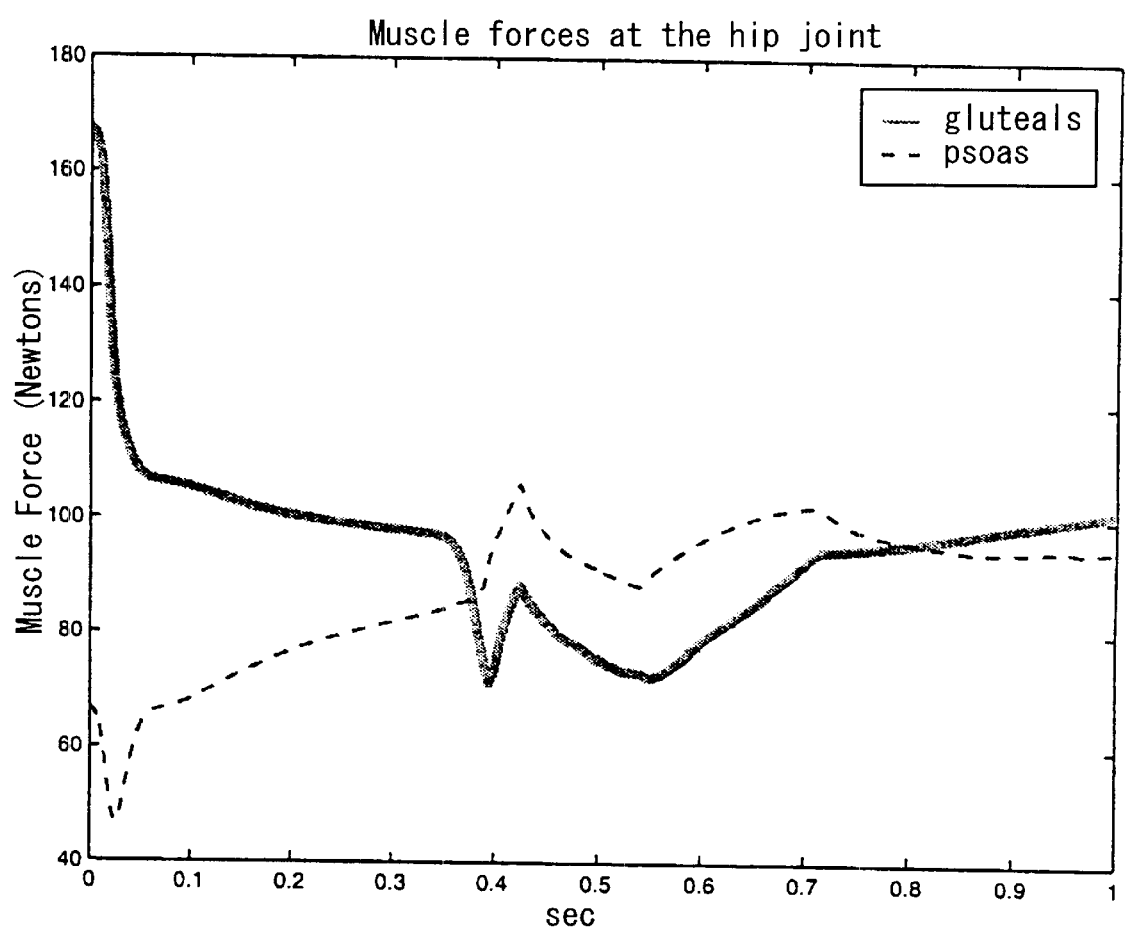
FIG. 16 shows transition of muscle forces at the hip joint after the robot is released from its initial position at time zero.

Similar statements can be made about all the other membership functions and their associated linguistic values. FIGS. 14–16 illustrate the muscle forces at the ankle joint, the knee joint, and the hip joint, respectively. The segment motion and the joint stiffness is modulated by simultaneous activation of the muscles at each joint. The gains in the controller can be adjusted to alter the stiffness at the joints.

Conclusion

We have proposed a fuzzy logic based model for quantitative analysis of human postural balance. The fuzzy logic approach presented here has tremendous implications toward development of more elaborate models used for digital human modeling in design and engineering. For example, current crash test dummies do not consider the reflexive, anticipatory, and stiffness modulation which humans encounter in pre-crash situations. Theoretical models which incorporate motor control behavior provide an accurate and powerful tool to engineers and scientist in improving safety to motorists.

The salient features of the model include:

No prior knowledge about the physical parameters of the human model is required.

The model can be readily extended to incorporate complex nonlinear muscle models and transmission delays in the efferent and afferent pathways.

Joint impedance can be modulated by coactivation of muscle pairs.

The current model may be improved in the following way:

In future studies, the coupling between successive links in a multi-linkage system should be studied and incorporated.

Tuning the controller in order to achieve a desired performance based on experimental observation can be cumbersome. A learning mechanism may be developed such that the parameters in the controller as well as the knowledge base are automatically learned from prior data.

The rule base should be data driven, for example the activation sequence should be based on observed 'EMG (Electromyography)' patterns, rather than the crude assumptions that are made in the level of coactivation. There are two types of EMG measurements. The first is surface electromyography which utilizes button electrodes taped to the skin over the muscles of interest. The second type is fine-wire electromyography which incorporates fine-wire electrodes.

While the invention was described relative to specific embodiments, they are intended to be illustrative only and not limiting the scope of the invention.

What is claimed is:

1. A fuzzy control system for controlling a posture of an object having at least a part that is moved by a pair of actuators provided at one end thereof, comprising:

a system dynamics unit for detecting regulation error of said part, the regulation error being an error of the position of said part relative to a desired position; and a fuzzy controller, responsive to the regulation error and regulation error rate, for performing fuzzy inference process to provide outputs for driving said pair of actuators, whereby the pair of actuators provide antagonist/agonist forces to said part for bringing said object into a regulated posture.

2. The system according to claim 1, wherein said system dynamics includes a controller for controlling the posture of said object, said part being an artificial leg and said pair of actuators acting as muscles for moving the leg.

3. The system according to claim 2, wherein said object is a biped walking robot.

4. The system according to claim 2, wherein said fuzzy controller comprises:

fuzzification interface;

a knowledge base including a set of control rules on how to control the system;

an inference mechanism for evaluating which control rules out of said set of control rules are relevant at the current time and providing outputs; and defuzzification interface for converting the outputs of the inference mechanism into the input to the system dynamics.

5. The system according to claim 4, wherein said fuzzy controller has two inputs corresponding to scaled regulation error and regulation error rate respectively, and has outputs that are to be scaled to produce neural firing rate inputs that generate the muscle forces for said pair of actuators.

6. The system according to claim 5, wherein said knowledge base includes a rule table of conditional statements, said scaled regulation error and said regulation error rate being if-parts of the conditional statements and said outputs being then-parts of the conditional statements.

7. The system according to claim 4, wherein said defuzzification interface, responsive to the outputs from the inference mechanism, produces a single crisp number using centroid defuzzification method.

8. A fuzzy control system for controlling a posture of a biped walking robot having a leg, a thigh and a trunk, the leg being moved by a pair of actuators provided at one end thereof, comprising:

a musculoskeletal system unit for detecting regulation error of the leg, the regulation error being an error of the position of the leg relative to a desired position; and a leg segment fuzzy controller, responsive to the regulation error and regulation error rate, for performing fuzzy inference process to provide outputs for driving said pair of actuators, whereby the pair of actuators provide antagonist/agonist forces to the leg for bringing the robot into a regulated posture.

9. The system according to claim 8, wherein said musculeskeletal system unit detects regulation error of the thigh, the regulation error being an error of the position of the thigh relative to a desired position, said system further comprising a thigh segment fuzzy controller, responsive to the regulation error and regulation error rate of the thigh, for performing fuzzy inference process to provide outputs for driving the thigh.

10. The system according to claim 9, wherein said musculeskeletal system unit detects regulation error of the trunk, the regulation error being an error of the position of the trunk relative to a desired position, said system further comprising a trunk segment fuzzy controller, responsive to the regulation error and regulation error rate of the thigh, for performing fuzzy inference process to provide outputs for driving the trunk.

* * * * *